United States Patent [19]
Van Den Goor

[11] Patent Number: 5,909,797
[45] Date of Patent: Jun. 8, 1999

[54] CONVEYOR WITH ENDLESS CONVEYOR ELEMENT HAVING INTERCONNECTED CARRIERS

[75] Inventor: Jacobus M. Van Den Goor, Nuenen, Netherlands

[73] Assignee: Vanderlande Industries Nederland B.V., Veghel, Netherlands

[21] Appl. No.: 08/778,819

[22] Filed: Jan. 3, 1997

[30] Foreign Application Priority Data

Jan. 8, 1996 [NL] Netherlands ............................ 1002039

[51] Int. Cl.⁶ ........................... B65G 47/34; B65G 35/06; B65G 17/06
[52] U.S. Cl. .................... 198/370.02; 198/619; 198/851; 198/853
[58] Field of Search ............................... 198/370.02, 619, 198/851, 853

[56] References Cited

U.S. PATENT DOCUMENTS

| | | | |
|---|---|---|---|
| 3,788,447 | 1/1974 | Stephanoff | 198/619 |
| 4,128,163 | 12/1978 | Rana et al. | 198/370.02 |
| 4,817,694 | 4/1989 | Matsuo et al. | 198/619 |
| 5,127,510 | 7/1992 | Cotter et al. | 198/370.02 |
| 5,170,714 | 12/1992 | Katagiri | 198/619 |
| 5,427,223 | 6/1995 | Van Den Goor | |
| 5,435,429 | 7/1995 | Van Den Goor | |
| 5,537,929 | 7/1996 | Miura et al. | 198/619 |
| 5,590,995 | 1/1997 | Berkers et al. | |
| 5,595,279 | 1/1997 | Wilkins et al. | 198/370.02 |

FOREIGN PATENT DOCUMENTS

| | | | |
|---|---|---|---|
| 529157 | 3/1993 | European Pat. Off. | 198/619 |
| 63-66025 | 3/1988 | Japan | 198/619 |

*Primary Examiner*—William E. Terrell
*Assistant Examiner*—Steven B. McAllister
*Attorney, Agent, or Firm*—Oblon, Spivak, McClelland, Maier & Neustadt, P.C.

[57] ABSTRACT

The invention relates to a conveyor provided with a frame and with an endless conveying element, which can be moved in a longitudinal direction by a drive mechanism during operation. The conveying element furthermore includes interconnected carriers, which are pivotable with respect to each other about upwardly extending pivot pins. The carriers are guided by guide wheels coupled to the carriers, which during operation roll on guide rails connected to the frame, and which are near end portion thereof provided with guide wheels, which are rotatable about axes of rotation extending parallel to the pivot pins. A pivot pin, about which a carrier is pivotable with respect to the adjacent carrier, lies in one plane with the axes of rotation extending parallel to the pivot pin of the guide wheels provided on the adjacent carrier.

9 Claims, 3 Drawing Sheets

CONVEYOR WITH ENDLESS CONVEYOR ELEMENT HAVING INTERCONNECTED CARRIERS

DISCUSSION OF THE BACKGROUND

1. Field of the Invention

The invention relates to a conveyor provided with a frame and with an endless conveying element, which can be moved in its longitudinal direction by driving means during operation and which is provided with interconnected carriers, which are pivotable with respect to each other about upwardly extending pivot axes, while the carriers are guided by means of guide wheels coupled to said carriers, which during operation roll on guide rails connected to the frame.

2. Discussion of the Background

A conveyor of this type is for example known from European Patent Applications Nos. 0 626 324 and 0 628 502. These known conveyors are satisfactory per se in practice, but in certain cases a better guidance and support of the carriers may be desirable.

According to the invention this may be accomplished in that said carriers are near their ends provided with guide wheels, which are rotatable about axes of rotation extending parallel to said pivot axes, while a pivot axis, about which a carrier is pivotable with respect to the adjacent carrier, lies at least substantially in one plane with the axes of rotation extending parallel to said pivot axis of the guide wheels provided on said adjacent carrier.

By arranging the pivot axis about which a carrier is pivotable with respect to the adjacent carrier in one plane with the axes of rotation of the guide wheels guiding said adjacent carrier and rolling on guide rails, movement of the pivot axis in question in a direction transverse to the longitudinal direction of the guide rails is prevented. In fact the position of the pivot axis of a carrier as well as the position of the guide wheels connected to said carrier, which guide wheels are rotatable about axes of rotation extending parallel to said pivot axis, with respect to the rails co-operating with the respective guide wheels are fixed. Therefore, undesirable oscillating movements of a carrier about an upwardly extending axis are prevented.

When, according to another aspect of the invention, guide rollers being rotatable about axes of rotation crossing the pivot axes at least substantially perpendicularly are provided near the sides of a carrier, near the guide wheels provided on the carrier in question, which guide wheels are provided in such a manner as to be rotatable about axes of rotation extending parallel to said pivot axes, oscillating movement of a carrier about an axis extending transversely to the longitudinal direction of the endless conveying element is also prevented in an effective manner.

All this leads to a stable support of the carriers and also to a steady movement of the carriers, which is conducive to a controlled transport of the goods to be conveyed by the conveyor.

BRIEF DESCRIPTION OF THE DRAWINGS

The invention will be explained in greater detail hereafter with reference to a few embodiments of the construction according to the invention diagrammatically illustrated in the accompanying Figures.

DESCRIPTION OF THE PREFERRED EMBODIMENTS

Figure 1:
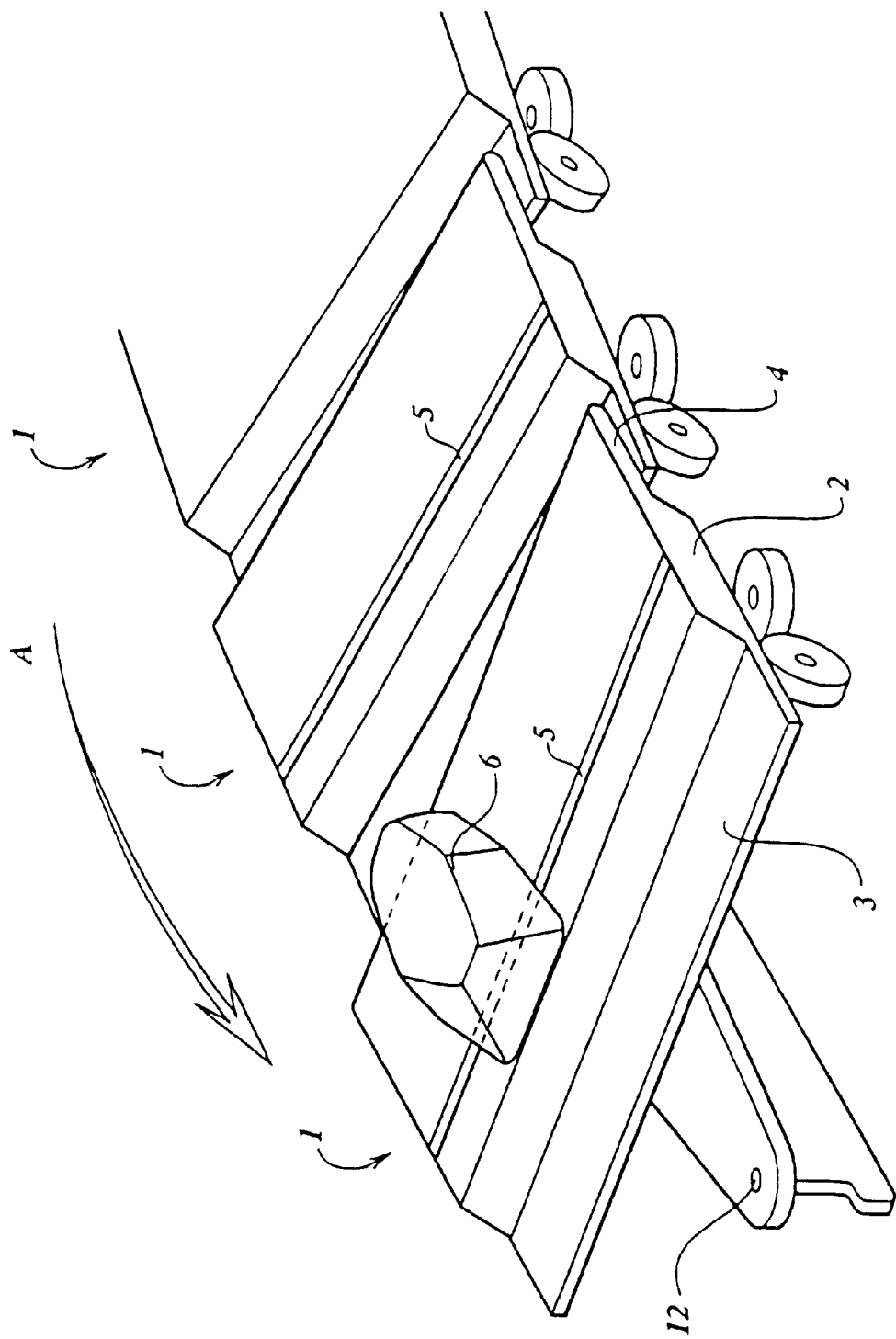
FIG. 1 is a diagrammatic perspective view of a part of the conveying element built up of interconnected carriers.

FIG. 1 shows a few carriers 1 of a endless conveying element built up of such pivotably interconnected carriers, which will be moved in the direction according to arrow A during normal operation. As is apparent in particular from FIG. 3, a carrier 1 used in the illustrated embodiment is built up of a central portion 2, whereby a plate-shaped part 3 extending in forward direction, as seen in the direction of movement according to arrow A, joins the bottom side of said central portion 2, while a plate-shaped part 4 extending in a direction opposed to the intended direction of movement according to arrow A joins the upper side of said central portion 2. As is apparent from FIG. 1, plate-shaped part 3 is substantially rectangular, as seen in plan view.

A slot 5 extending in the longitudinal direction of the carrier, transversely to the intended direction of movement of conveying element A, therefore, is provided in central portion 2 of carrier 1. A pusher shoe 6 rests on the upper side of carrier 1, which upper side is made up of the upper surfaces of central portion 2, which are in line, and the rearwardly projecting plate-shaped part 4. An arm 7 extending through slot 5 is attached to the underside of said pusher shoe. A guide roller 8 is attached to the underside of arm 7, which guide roller is capable of cooperation with guide members (not shown) during operation, in order to be able to move pusher shoe 6 to and fro along carrier 1, as is for example described in the aforesaid publications.

An arm 9 extending in a forward direction with respect to plate-shaped part 3 is attached to the underside of said plate-shaped part 3, near the center of said plate-shaped part 3. A plate 10 extending perpendicularly to arm 9 is attached to the underside of said arm.

Figure 3:
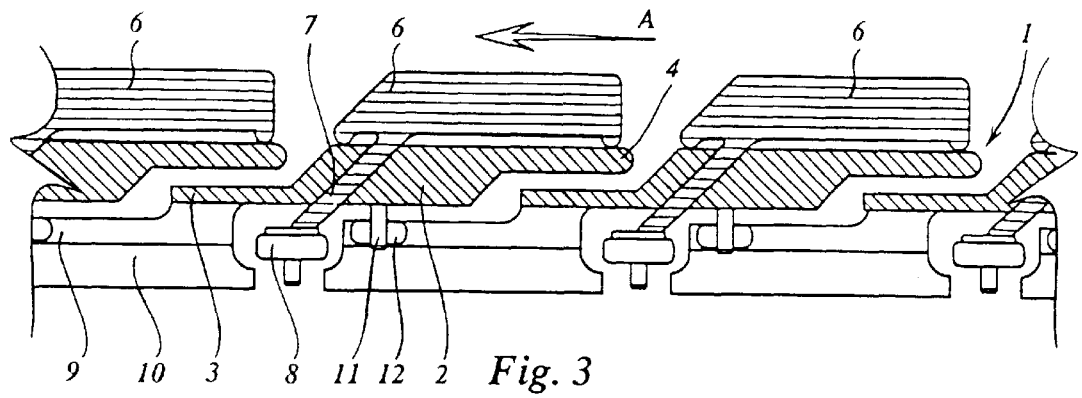
FIG. 3 is a cross-sectional view of a plurality of interconnected carriers.

An upwardly, generally vertically extending pin 11 is attached to central portion 2 of carrier 1, which pin is journalled in a bearing 12 with its lower end, in such a manner as to be freely rotatable about its central pivot axis, said bearing being attached to arm 9 of an adjacent carrier, as will be apparent in particular from FIG. 3.

Figure 4:
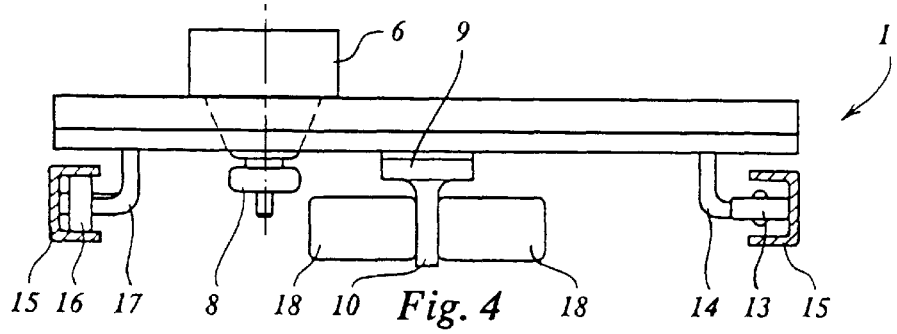
FIG. 4 is a front view of a carrier.

As shown in FIG. 4, guide wheels 13 are provided near the ends of each carrier 1 by means of arms 14 attached to the carrier, all this in such a manner that said guide wheels 13 are freely rotatable about axes of rotation extending parallel to pivot pins 11. During operation said guide wheels 13 will roll along guide rails 15 forming part of the frame of the conveyor.

In addition to that further guide wheels 16 are provided near the ends of each carrier, which guide wheels are connected to the respective carrier by means of arms 17. The guide wheels 16, which likewise co-operate with the guide rails 15, are thereby rotatable about axes of rotation which cross the axes of rotation of guide wheels 13 perpendicularly.

Figure 2:
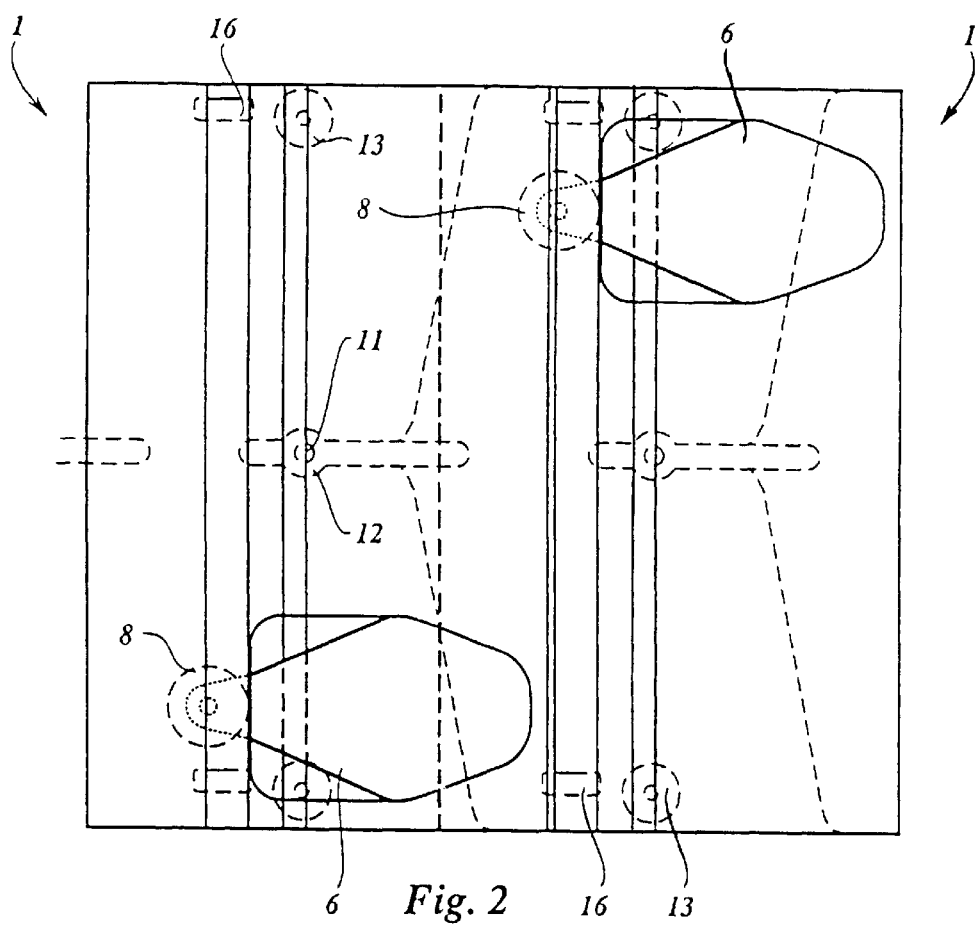
FIG. 2 is a plan view of part of the conveying element.

As will be apparent in particular from FIG. 2, the arrangement is such that the central axis of a pivot pin 11 connected to one carrier 1, about which two adjacently arranged carriers are pivotable with respect to each other, lies in one plane with the axes of rotation of guide wheels 13, which are connected to the other carrier 1 of the two carriers connected by pin 11. The position of a carrier near the guide wheels 13 being rotatable about axes of rotation is precisely determined by the guide rail 15 co-operating with said guide wheels 13, while movement in a direction transverse to the guide rails is prevented. Since the central axis of the pivot pin 11 connected to the adjacent carrier lies in a single plane with the axis of the guide wheels 13, undesirable movement of said pivot pin 11 transverse to the longitudinal direction of the rails 15, and thus undesirable oscillating movement of the respective carrier about an imaginary upwardly extending axis is likewise prevented. Wheels 16, which are disposed near wheels 13, prevent undesirable oscillating movements of the carrier about an imaginary axis extending in the longitudinal direction of said carrier, perpendicular to the plane of the drawing of FIG. 4.

Linear motors 18 diagrammatically indicated in FIG. 4 may be used efficiently for driving the endless conveying element built up by means of the carriers, which motors co-operate with the plates 10 connected to the carriers. It would also be possible, however, to use driving belts or the like co-operating with plates 10 for said driving.

Figure 5:
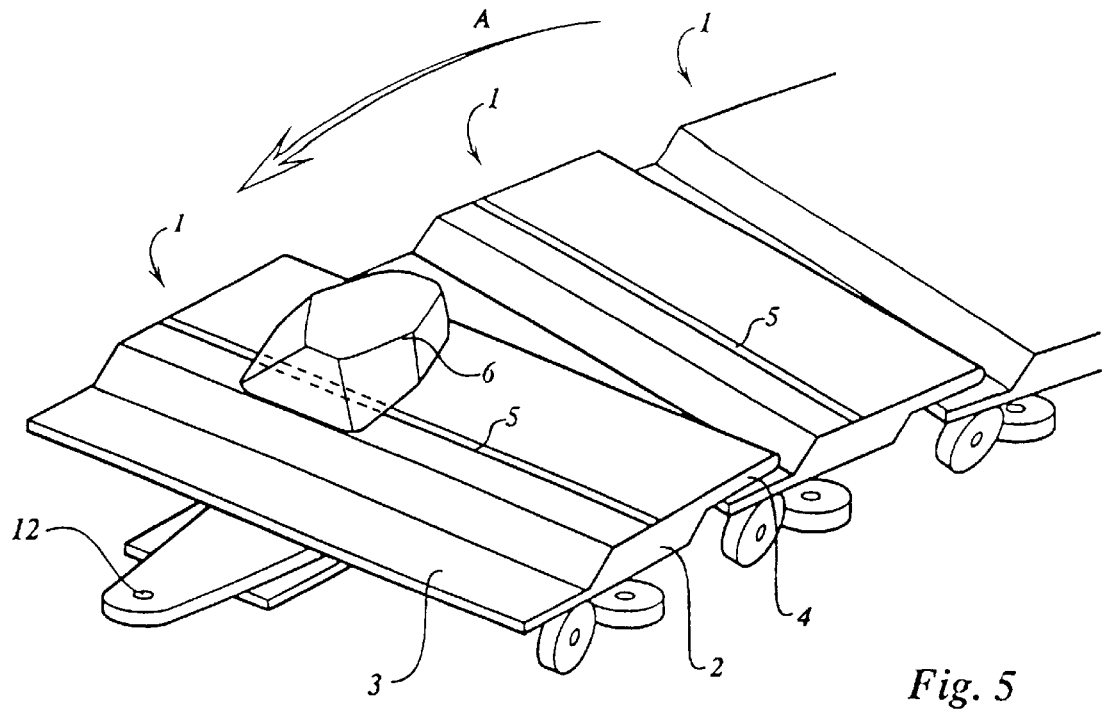
FIG. 5 is a diagrammatic perspective view of a second embodiment of a conveying element built up of interconnected carriers.
Figure 6:
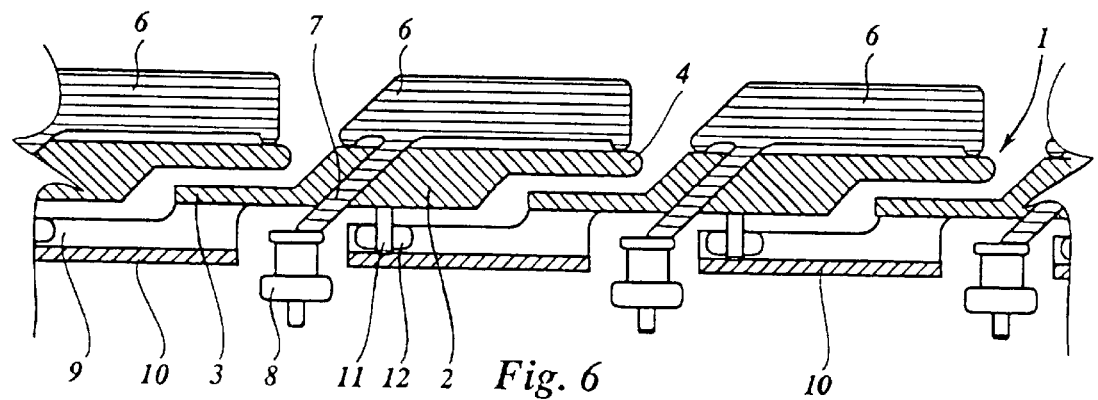
FIG. 6 is a cross-sectional view of a few of the carriers of the conveying element shown in FIG. 5.
Figure 7:
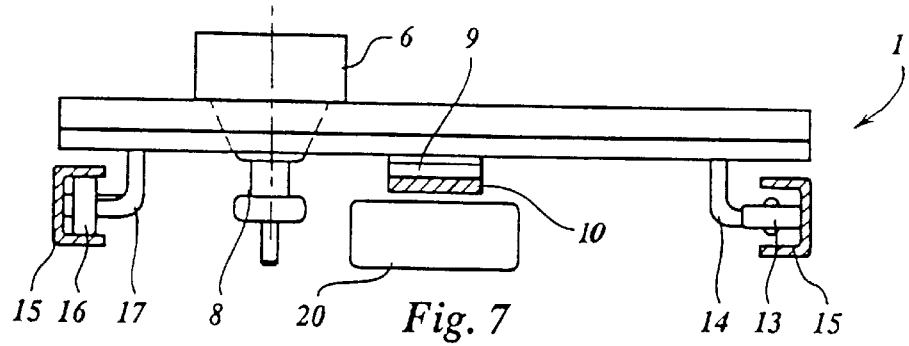
FIG. 7 is a front view of a carrier shown in FIGS. 5 and 6.

The embodiment of the conveyor according to the invention shown in FIGS. 5–7 largely corresponds with the embodiment described above with reference to FIGS. 1–4, and consequently like parts are numbered alike in the various Figures.

In this embodiment the plate 10 of the first embodiment attached to arm 9 is exchanged for a plate 19, which has been turned through an angle of 90° with respect to the position which plate 10 occupies. Linear motors 20 disposed under plates 19 may be used for driving the endless conveying element assembled from the carriers. Said linear motors 20 will exert a downward force, seen in FIG. 7, on the carriers, and said force can be taken up by wheels 16, which are connected to the carriers.

As is furthermore shown in FIGS. 6 and 7, the guide wheels 8 co-operating with the pusher elements may thereby be arranged in such a manner that said guide wheels are disposed under plates 19. A significant advantage of this is that the guide rails co-operating with guide wheels 8 need not be interrupted to make it possible for plates 19 to pass. Consequently no separate measures need to be taken to ensure a proper guidance of the guide rollers 8 for moving the pusher shoes to and fro along the respective carrier. This leads to a considerable simplification of the construction of the conveyor.

Figure 8:
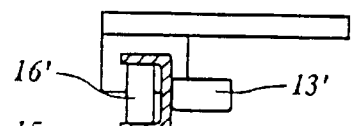
FIG. 8 is a diagrammatic view of a further possible arrangement of guide wheels coupled to one end of a carrier.

FIG. 8 furthermore shows an embodiment wherein a guide wheel 16' runs in a U-shaped guide rail 15 and wherein said guide wheel is positioned on the side of the upright leg of the guide rail facing away from the side of the guide rail that co-operates with guide wheel 13'. It will be apparent that such an arrangement of the guide wheels 13' and 16' makes it possible to arrange the axes of rotation of the various guide wheels 13' and 16' connected to a carrier in one plane, which is particularly advantageous with a view to preventing oscillating movements of the respective carrier about its longitudinal axis.

I claim:

1. A conveyor, which comprises:
   a frame;
   an endless conveying element which is movable in a longitudinal direction by a drive member during operation;
   guide rails connected to the frame;
   a plurality of interconnected carriers, said carriers each having a pusher shoe mounted thereon so as to be movable with said carriers, wherein said carriers are pivotable with respect to one another by a pivot defining an upwardly extending pivot axis;
   first guide wheels coupled to said carriers and guiding said carriers, which during operation roll on said guide rails, wherein said carriers are, near end portions thereof, provided with second guide wheels which are rotatable about axes of rotation extending parallel to said pivot axis, wherein an upwardly extending pivot axis, about which a first carrier is pivotable with respect to an adjacent carrier, lies at least substantially in a single plane with the axes of rotation extending parallel to said upwardly extending pivot axis of said second guide wheels provided on said adjacent carrier wherein adjacent carriers are provided with overlapping plate-shaped parts and wherein said pivot member coupling two adjacent carriers with each other is arranged between a lower side of one carrier and a part of another carrier extending below said one carrier.

2. A conveyor according to claim 1, which comprises said second guide wheels provided near the side of at least one of said carriers, said second guide wheels being rotatable about axes of rotation which lie in a plane crossing the pivot axes of the first guide wheels at least substantially perpendicularly and which are positioned near the first guide wheels provided on said at least one carrier.

3. A conveyor according to claim 1 or 2, wherein the axes of rotation of the second guide wheels connected to a carrier all lie in said single plane.

4. A conveyor according to claim 1, wherein one of said carriers is provided with an arm which during operation extends in a forward direction, as viewed in an intended direction of movement of the carrier, by which the carrier is coupled to an adjacent carrier by means of said pivot axis.

5. A conveyor according to claim 1, which comprises a linear motor located in the frame of said carrier and a plate attached to one of said carriers for co-operation with said linear motor.

6. A conveyor according to claim 5, wherein said plate extends substantially perpendicularly to an upper surface of said one of said carriers and wherein said linear motor is mounted in said frame, at a lower level than said plate, and wherein said pusher shoe is movable along said carriers, said pusher shoe being connected to a guide member for the pusher shoe positioned under said carrier, said guide member being disposed at a lower level than the plate connected to the respective carrier, which co-operates with said linear motor during operation.

7. A conveyor provided with a frame and with an endless conveying element, which is movable in a longitudinal direction thereof by a driving member during operation and which is provided with interconnected carriers which are pivotable with respect to each other by pivot members respectively defining upwardly extending pivot axes, wherein the carriers are guided by first guide wheels coupled to said carriers, which during operation roll on guide rails connected to the frame,
   wherein said carriers are, in proximity with end portions thereof, provided with second guide wheels, which are rotatable about axes of rotation extending parallel to, and substantially coplanar with, said pivot axes,
   wherein each carrier comprises an arm extending forward and below an adjacent carrier, the pivot member being provided between said arm and a lower side of said adjacent carrier, and wherein a pusher shoe is movable along a carrier, said pusher shoe being connected to a guide member for the pusher shoe positioned under said carrier so as to be movable in the longitudinal direction of said carrier in a space formed between the front end of the arm of one carrier and the rear end of the arm of an adjacent carrier.

8. A conveyor according to claim 7, wherein said pusher shoe is connected with the guide member by an arm extending through a slot in the carrier.

9. A conveyor provided with a frame and with an endless conveying element, which is movable in a longitudinal direction by a driving member during operation and which is provided with interconnected carriers which are pivotable with respect to each other by pivot members defining an upwardly extending pivot axis, wherein the carriers are guided by means of first guide wheels coupled to said carriers, which during operation roll on guide rails connected to the frame, wherein said carriers are near their ends provided with second guide wheels, which are rotatable about axes of rotation extending parallel to, and substantially coplanar with, said pivot axes, each of said carriers comprise an arm extending forward and below an adjacent carrier, the pivot members being provided between said arm and a lower side of said adjacent carrier, wherein a pusher shoe is movable along a carrier, said pusher shoe being connected to a guide member for the pusher shoe positioned under said carrier, wherein a plate is attached to a lower side of each carrier for cooperation with a linear motor accommodated in the frame of the conveyor at a lower level than said plate and wherein said guide member is disposed at a lower level than said plate.

* * * * *